July 6, 1965

P. A. MANOR ETAL 3,192,942

PLUG VALVE ASSEMBLY

Original Filed June 3, 1957

INVENTORS
Paul A. Manor
Charles V. Staller

BY Strauch, Nolan & Neale

ATTORNEYS

INVENTORS
PAUL A. MANOR
CHARLES V. STALLER

ATTORNEYS

July 6, 1965  P. A. MANOR ETAL  3,192,942
PLUG VALVE ASSEMBLY
Original Filed June 3, 1957  5 Sheets-Sheet 3

INVENTORS
PAUL A. MANOR
CHARLES V. STALLER
BY
ATTORNEYS

United States Patent Office 3,192,942
Patented July 6, 1965

3,192,942
PLUG VALVE ASSEMBLY
Paul A. Manor, Pittsburgh, Pa., and Charles V. Staller, Yonkers, N.Y., assignors to Rockwell Manufacturing Company, Pittsburgh, Pa., a corporation of Pennsylvania
Continuation of application Ser. No. 663,175, June 3, 1957. This application Aug. 15, 1961, Ser. No. 133,283
17 Claims. (Cl. 137—246.19)

This invention relates to plug valves and particularly to stem seal arrangements. This application is a continuation of Serial No. 663,175, filed June 3, 1957 and now abandoned.

The invention particularly concerns special seal constructions which may be tightened axially on the valve stem without changing the peripheral sealing of the valve stem.

Prior to the invention it was common and accepted practice to seal against leakage of line fluid outwardly along the stem of a plug valve by providing a compressible ring of asbestos or like material between the stem and the surrounding bore in the valve cover or casing and compress the ring axially of the stem by means of a screw threaded or bolted gland. This axial compression resulted in radial expansion of the ring into engagement with the bore and the stem. The force axially transmitted through the ring was also effective to urge the inner periphery of an annular sealing diaphragm assembly against the top of the plug but that force could not be too tight or it would bind the plung against normal rotation. Also the radial deformation of the asbestos ring relied upon to seal the stem in the opening had to be limited because it might bind the stem against rotation. Thus the proper tightening of the gland had to be effected without producing these excessive axial and radial forces, and usually a compromise arrangement was the best possible with the result that these seals were often inadequate. This was particularly true after wear in the field and it was attempted to adjust the seal tight when leakage appeared. Furthermore, even if the gland was correctly tightened and the asbestos ring properly deformed at first, the asbestos and other such materials used in the ring tend to soon set and harden and lose whatever elasticity they may have had and sometimes they even shrink so that leakage quickly appeared along the valve stem. The worker in the field could only tighten the gland to try to overcome this difficulty but in doing so he usually produced the undesired excessive radial and axial transmitted forces at the ring and the packing soon became either so solid as to act as a brake preventing turning of the valve plug or otherwise deteriorated to the point where further tightening of the gland had no effect on the seal.

It is therefore a major object of the invention to provide a novel stem packing arrangement for a plug valve wherein axial adjustment of the gland retaining the packing does not change the peripheral sealing characteristics of the packing.

A further object of the invention is to provide a novel seal arrangement for a plug valve stem wherein concentric deformable rings are interposed between rigid axially adjustable members slidably surrounding the valve stem.

A further object of the invention is to provide a novel plug valve stem packing using deformable seal rings made of a tetrafluoroethylene polymer, silicone rubber and the like for high temperature service.

Another important object of the invention is to provide a novel plug valve stem seal that is easy to install or replace in the field.

Further objects of the invention will appear as the description proceeds in connection with the annexed claims and the appended drawings wherein:

FIGURE 10–A is a diagrammatic explanation of the action of a "Belleville" type spring washer shown in FIGURES 11, 12 and 13;

Figure 1:
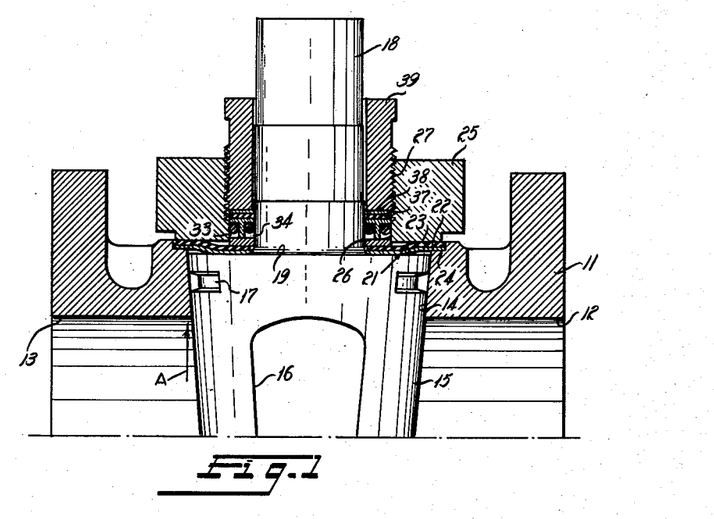
FIGURE 1 is a fragmentary view in section showing a lubricated tapered plug valve incorporating an embodiment of the seal of the invention.

FIGURE 1 illustrates a generally conventional lubricated plug valve assembly wherein a body 11 is formed with aligned fluid flow passages 12 and 13 intersected substantially at right angles by a tapered bore 14 in which is rotatably mounted the plug 15 having a through port 16 adapted to close fluid communication between passages 12 and 13 when disposed as in FIGURE 1, or to be rotated 90° to interconnect passages 12 and 13. Suitable lubricant grooving is indicated at 17 whereby lubricant may be introduced thereinto and distributed through connecting grooves to the tapered seating surfaces of the valve plug in the bore. The foregoing is conventional and not part of the present invention, and any conventional lubricant admission and distribution may be used.

Plug 15 is formed with a rigid stem 18 upstanding from the flat annular top surface 19. An annular flexible diaphragm 21, which is preferably made of a flat spring metal ring 22 laminated with a superposed ring 23 of asbestos, rubber or like compressible material has its outer periphery clamped between an annular shoulder 24 surrounding the open top of bore 14 and a relatively heavy body cover 25 that is rigidly but removably secured, as by bolts (not shown), to body 11.

Cover 25 has a smooth cylindrical lower bore portion 26 and a threaded upper bore portion 27 spaced from stem 18. A sealing assembly is disposed within bore 26 around the stem and comprises a flat rigid metal ring 28 that overlies the inner periphery of compressible ring 23, and a rigid ring 29 of T-shape in cross-section having a flat bridge 31 parallel to and of the same internal and external diameters as ring 28 and a leg 32 contacting ring 28.

Disposed in the annular spaces 33 and 34 thus provided are rings 35 and 36 of a deformable material such as rubber, nylon or "Teflon" of circular cross-section, so-called O-rings, which have such diameter as to be radially compressed in the assembly of FIGURE 1 while not confined axially because of the sizes of spaces 33 and 34. "Teflon" and silicone are less resilient than rubber but are inert with respect to high temperatures which will destroy ordinary rubber. Silicone rubber may be used in some high temperature applications. When the seal rings 35 and 36 are assembled with T-shaped ring 29 and flat ring 28 as shown in FIGURE 1, the assembly comprises a cartridge such as disclosed in the copending application of Anthony W. Renfro Serial No. 570,812, filed March 12, 1956, now United States Letters Patent No. 2,876,987, dated March 10, 1959.

Above bridge 31 are disposed in succession a flat ring 37 of compressible and expansible resilient material such as synthetic rubber and a flat smooth surfaced metal ring 38. A gland 39 externally threaded into the cover at 27 may be tightened to urge the entire seal assembly therebelow against the diaphragm with adequate force to prevent leakage and to provide proper seating force to seat the tapered plug 15 in bore 14 and, no matter how tight gland 39 is drawn there is always the same radial seal provided between the cover and valve stem by the O-rings which do not change their condition with tightening of gland 39. The smooth circular peripheries of ring 28 and bridge 31 slidably engage the stem and bore 26 as the gland is tightened.

When gland 39 is drawn tight it compresses resilient ring 37 to thereby preload the ring to a condition where its tendency to expand exerts and maintains the plug seating force, but when the lubricant pressure at the plug seats is increased to jack the plug and body apart ring 37 further compresses readily to permit such jacking and to a substantially solid condition where it offers a positive stop to further separational displacement of the plug with respect to the body to limit the lubricant discharge space size, and then after the jacking force is no longer applied ring 37 expands to its preload condition to maintain plug seating force. The size and physical characteristics of ring 37 can be so selected as to accomplish this action. During all of this operation of jacking and return to preload the radial seal assembly moves on the stem without changing the stem seal.

Figure 2:
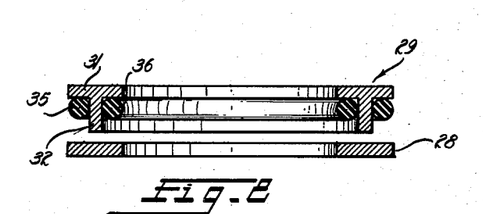
FIGURE 2 is an exploded section showing the seal assembly per se.
Figure 3:
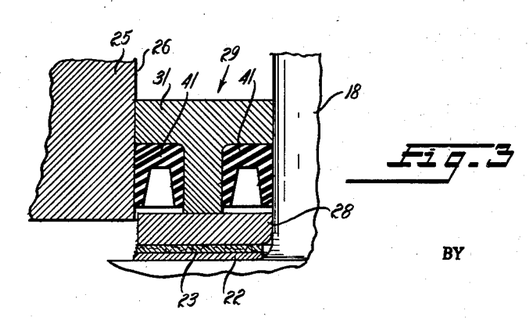
FIGURE 3 is a fragmentary view in section of a further embodiment using non-circular cross-section seal rings.

FIGURE 3 shows a variation of the invention wherein radially compressed but axially free inverted U-shaped flexible deformable seal rings 41 are used in the annular spaces between the leg of the T-ring and the gland and cover.

Where the valve assembly is for mostly high temperature services, the deformable seal rings are made of a plastic such as silicone rubber, or a tetrafluoroethylene polymer one source of which is sold under the name "Teflon" by E. I. duPont de Nemours & Co. Although adequately resilient for sealing, the tetrafluoroethylene polymer material or silicone rubber is not sufficiently stretchable to go over the flange 31 of FIGURE 2 without exceeding its elastic limit and hence for rings made of such material, so that the two part cartridge structure of FIGURE 2 is used.

Figure 4:
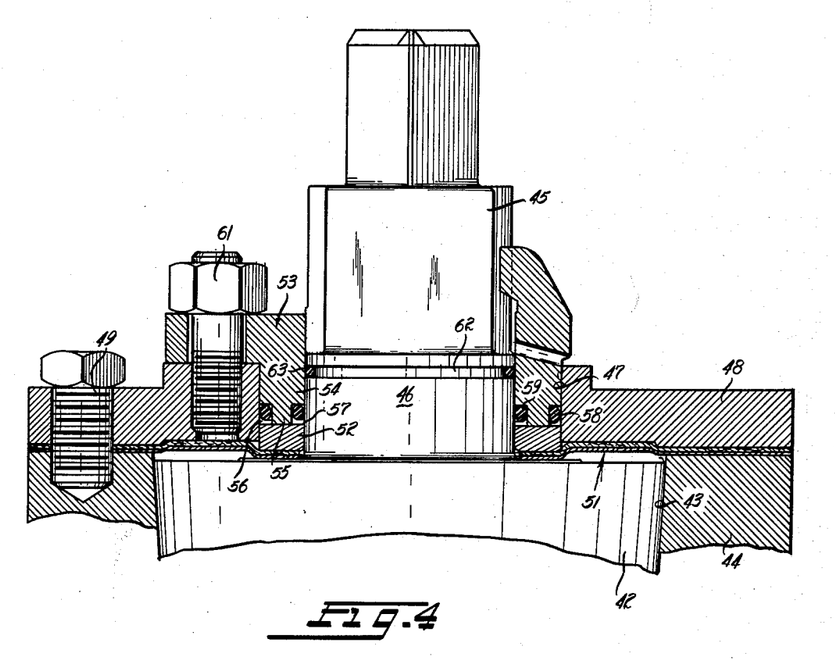
FIGURE 4 is a fragmentary view partly in section and partly in elevation showing another embodiment of the invention.
Figure 5:
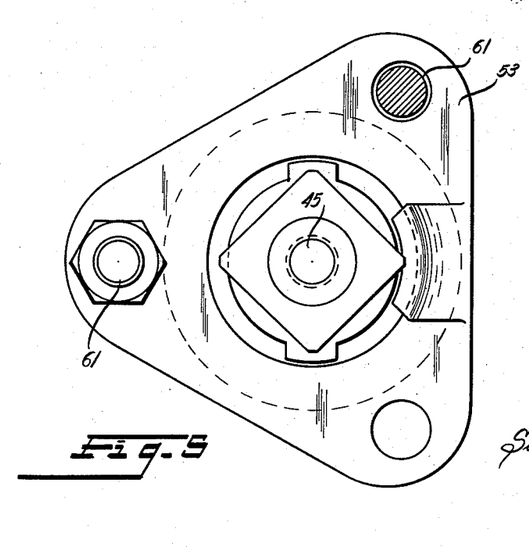
FIGURE 5 is a top plan view of the FIGURE 4 assembly.

FIGURES 4 and 5 illustrate another embodiment wherein a valve plug 42 rotatable in tapered bore 43 of body 44 has a rigid operating stem 45 with a cylindrical section 46 surrounded in spaced relation by the cylindrical bore 47 of a cover 48 secured to the body as by bolts 49. The outer periphery of the laminated flexible steel and compressible material diaphragm 51 is clamped between the cover and body.

A rigid flat-sided metal ring 52 is seated overlying the inner periphery of the diaphragm with a vertical sliding fit in the space between the bore 47 and stem section 46. A gland 53 has an annular skirt 54 extending slidably into the space between bore 47 and stem section 46, and at its lower end is formed with an integral centrally located depending leg 55 that extends down to contact ring 52 and defines annular sealing spaces 56 and 57 of about the same size in which are disposed the radially compressed but axially free rubber, nylon, "Teflon" or like resiliently deformable material O-rings 58 and 59.

When gland 53 is drawn tight, as by a series of stud assemblies at 61 threaded into the cover, the axial force on diaphragm 51 is increased to a desired degree without changing the radial seal of the O-rings in the assembly. If desired an annular groove may be provided in the valve stem at 62 to seat a deformable sealing O-ring 63 of synthetic rubber, nylon, "Teflon" or the like.

In the embodiment of FIGURE 4 when the plug is jacked from its seat by the lubricant pressure jacking force component the inherent resiliency of valve cover 48 is used to controllably limit the jacking movement of the plug and hence the separation at the plug and body seating surfaces so that these surfaces will not separate so much that the pressurized lubricant will merely discharge freely into the line at the point of highest pressure and not be spread around the seats. In the embodiment of FIGURES 1–3 the ring 37 limits the jacking movement. In the embodiments of FIGURES 6–12, special spring arrangements are employed for this particular purpose, as for use in valves wherein the covers may be too rigid to so function.

Referring to FIGURES 6–11 a rotatable plug valve assembly comprises a body 64 having a rigid bolted-on cover 65 and a usual tapered bore 66 in which is seated rotatably a tapered plug 67 having a rigid stem 68 and a lubricant reservoir 69 in the stem discharging through a radial passage 71 into an annular plug groove 72 opposite an annular seat surface groove 73. The usual laminated asbestos-steel diaphragm assembly at 74 is clamped between the cover and body at its outer periphery and its inner periphery seats a rigid flat metal ring 75.

Figure 6:
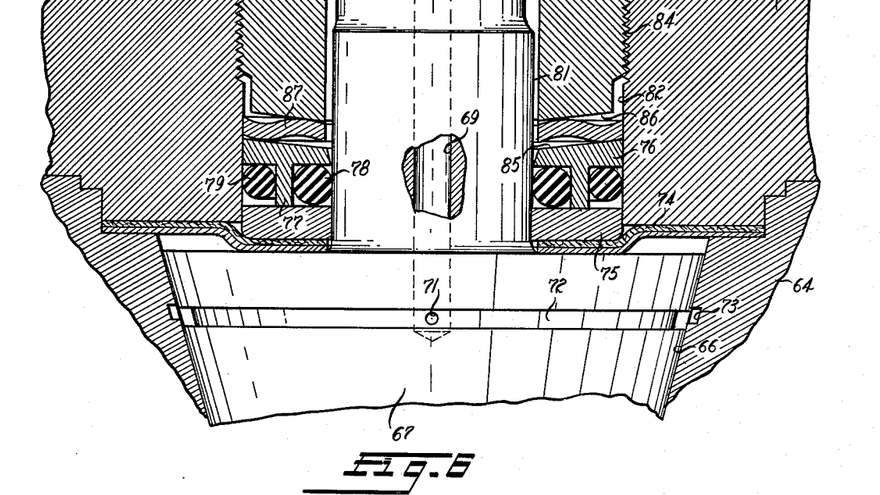
FIGURE 6 is a fragmentary view partly in section and partly in elevation showing a further embodiment of the invention.

A substantially T-shaped cross-section rigid metal ring 76 has a central rigid leg 77 contacting ring 75, and deformable O-rings 78 and 79 of synthetic rubber, nylon, "Teflon," or the like, are disposed in the spaces between leg 77 and the stem surface 81 and cover bore 82 respectively. These O-rings are, as in the other embodiments, radially compressed but freely expansible axially of the stem axis.

A gland 83 is threadedly mounted in the top of bore 72 at 84 and has radial clearance with stem surface 81. The upper flat annular surface 85 of ring 76 and the lower flat annular surface 86 of gland 83 are both inwardly inclined and parallel, and FIGURE 6 shows an annular spring washer 87 therebetween in its deformed preloaded normally operative position. The desired degree of preload on spring 87 may be adjusted by means of the threaded gland 83.

Figure 7:
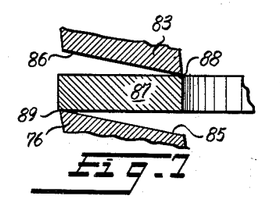
FIGURE 7 is a fragmentary section showing the relaxed spring washer in the FIGURE 6 embodiment.
Figure 8:
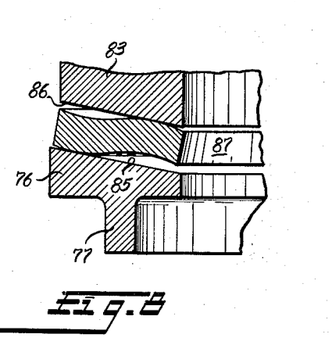
FIGURE 8 is a fragmentary section showing the assembly in the preloaded condition it occupies during normal operation.

As shown in FIGURE 7 spring ring 87 relaxed with respect to the assembly is a flat-sided circular annulus which is essentially a flat resilient steel washer. For example it may be of AS 101 or SAE 1074 steel heat treated to have a surface hardness of about 35–45 Rockwell C-Scale. When gland 83 is tightened the washer 87 is axially trapped between surfaces 85 and 86, with ring line contact at opposite edges as indicated at 88 and 89, and the washer is thereby torsionally stressed or twisted toward the condition shown in FIGURES 6 and 8. The degree of twist is not known, but for clarity, it is shown in exaggerated form. In twisted condition, with gland 83 serving as an abutment, stressed spring 87 provides a resilient seating force on the plug, and as shown in FIGURE 10 it has been found that the deflection of such an annular plate spring increases with load practically proportionately up to a certain point indicated at $L_1$ in FIGURE 10 and then any increase in load beyond that point will result in a much smaller proportional deflection increase until at another point indicated at $L_2$ it acts essentially as a positive stop to further plug displacement.

Figure 9:
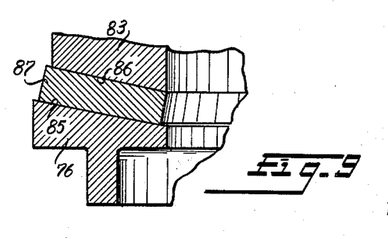
FIGURE 9 is a fragmentary section showing the fully deflected spring condition attained upon jacking of the plug.
Figure 10:
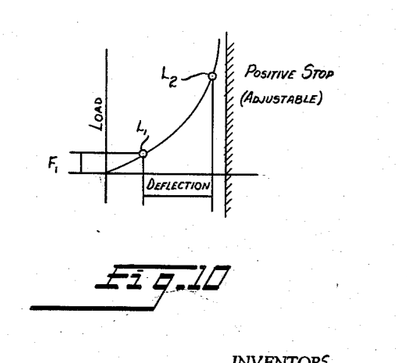
FIGURE 10 is a diagrammatic explanation of the action of the positive stop normally flat sided spring washer shown in FIGURES 6–9.

This is taken advantage of in the invention by so deflecting the spring 87 by gland adjustment in assembly that it is adequately preloaded to the point indicated as $L_1$ in FIGURE 10 to exert a plug seating force that resists any tendency of the plug to unseat due to components of line fluid pressure, but when stronger lubricant pressure is applied, the spring 87 will afford relative strong resistance as indicated in FIGURE 10 on the curve between $L_1$ and $L_2$ and in the assembly will by the time $L_2$ is reached have assumed the condition shown in FIGURE 9 where it is confined between surfaces 85 and 86. This FIGURE 9 position represents a positive stop to separation of the plug valve and body seats, and it can be designed to provide a predetermined film thickness of lubricant at those surfaces. When the lubricant jacking pressure is released, the spring 87 reasserts itself to expand and exert the preload seating pressure on the plug 67.

Figure 11:
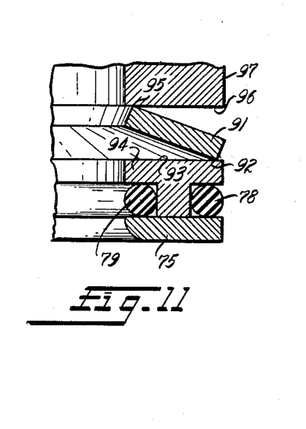
FIGURE 11 is a fragmentary section showing a "Belleville" type of spring washer in the FIGURE 6 type assembly.

FIGURE 11 illustrates an embodiment wherein the annular spring 91, which serves as the plug seating spring is of frusto-conical configuration when relaxed, being a normally dished annular plate spring of the kind known as a "Belleville" spring having its inner peripheral edge 92 in contact with smooth flat surface 93 of T-shaped ring 94 and its outer peripheral edge 95 in contact with smooth flat surface 96 of gland 97. Surfaces 93 and 96 are parallel and perpendicular to the stem axis. Spring 91, when gland 97 is axially tightened, assumes a preloaded plug seating position, and collapses further under lubricant pressure to a positive stop relation between surfaces 93 and 96 to provide exactly the correct seat separation for uniform introduction of plastic lubricant around the plug seating surfaces.

The curve of FIGURE 10A illustrates the load-deflection characteristics of a "Belleville" spring at various deflections. As shown, the curve of load vs. deflection rises rapidly at small deflections from its normal relaxed dish state, but at point C levels out and becomes substantially flat and remains so to the full deflection position. This type of spring has peculiar utility where the valve has no adjustable gland. The parts are so related that installation of the gland 131 compresses and preloads the spring 91 through C approximately to the horizontal flat region of the curve, which is the normal plug seating pressure, and when jacking pressure is applied the spring 91 quickly collapses to the positive stop condition, which condition determines the maximum thickness of the lubricant film.

Figure 12:
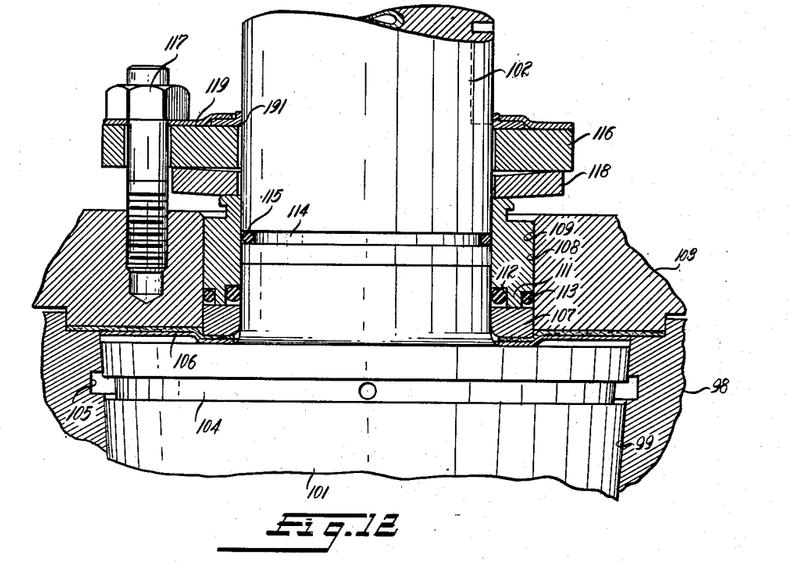
FIGURE 12 is a fragmentary section showing another embodiment of the invention.

Referring to FIGURE 12, a plug valve body casing 98 has a tapered bore 99 in which is rotatably seated a tapered plug 101 having a rigid stem 102 extending through a cover 103 bolted onto body 98. The plug and bore surfaces have opposed annular lubricant distribution grooves 104 and 105 supplied as in FIGURE 6, and the usual laminated steel and asbestos diaphragm 106 has its outer periphery clamped between the cover and body.

A rigid flat annular metal ring 107 overlies the inner periphery of the diaphragm, and a gland 108 is slidably disposed in the space between the valve stem and cover bore 109 with an integral central annular depending leg or rib 111 contacting ring 107. "Teflon" or like resilient O-rings 112 and 113 are axially free and radially compressed in the spaces between rib 111 and the stem and bore respectively.

Above rib 111, the valve stem is formed with an annular groove 114 in which is radially compressed a similar deformable O-ring 115 to seal with gland 108.

A flat annular rigid retainer plate 116 freely surrounds the upper end of stem 102 and it is connected to cover 103 by a series of equidistantly spaced stud assemblies (only one shown) 117. Between the bottom of plate 116 and the top of gland 108 is provided an annular dished plate spring 118 of the "Belleville" type which is compressed when studs 117 are tightened to axially shift gland 108 and increase the sealing pressure on the diaphragm. As in the FIGURE 11 embodiment, spring 118 is compressed or preloaded to exert a plug seating pressure, and to a point where application of lubricant jacking pressure collapses it to a substantially flat position wherein it strongly resists further deformation and acts as a positive stop to limit the valve seat separation to a predetermined small value. The top plate 116 is provided with an annular sheet metal plate 119 held thereon by studs 117 that pass through it and with its inner periphery clamping a flexible packing annulus 120 of asbestos or the like tight with stem 102 to provide a dust and weather-tight joint.

Figure 13:
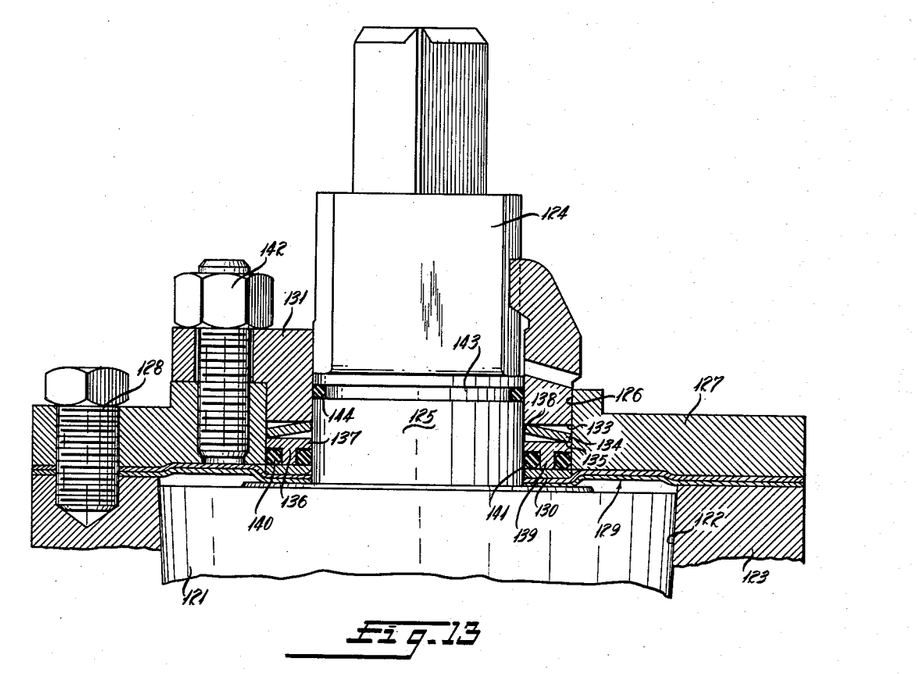
FIGURE 13 is a fragmentary view partly in section and partly in elevation showing another embodiment of the invention.

FIGURE 13 illustrates another embodiment wherein a valve plug 12 rotatable in tapered bore 112 of body 123 has a rigid operating stem 124 with a cylindrical section 125 surrounded in spaced relation by cylindrical bore 128 of a cover 127 secured to the body as by bolts 128. The outer periphery of the laminated flexible steel and compressible material diaphragm 129 is clamped between the cover and body.

A rigid flat-sided metal ring 130 is seated overlying the inner periphery of the diaphragm with a vertical sliding fit in the space between the bore 126 and stem section 125. A gland 131 has an annular skirt 132 extending slidably into the space between bore 126 and stem section 125, and at its lower end, face 133 is formed flat and parallel with the flat side of ring 130.

Disposed between end face 133 and the ring 130 is a "Belleville" spring 134 having an inner peripheral edge 135 in contact with the top flat surface 136 of a T-shaped cross-section ring 137 and its outer peripheral edge 138 in contact with end face 133 of gland 131. The flat end face 133 is parallel to flat surface 136 and both are perpendicular to the stem axis.

The T-shaped ring 137 has a central rigid leg 139 contacting a flat side of ring 130, and deformable O-rings 140 and 141 of synthetic rubber, nylon, "Teflon" or the like are disposed in the spaces between leg 139 and the surface of stem cylindrical section 125 and cover bore 126 respectively. These O-rings are, as in the other embodiments, radially compressed, but freely expansible axially.

When the gland 131 is drawn tight, as by a series of stud assemblies at 142 threaded into the cover, the axial force on diaphragm 129 is increased to a desired degree by the biasing action of spring 134 which is deflected to be within the flat portion of its load curve. This does not change the radial seal of the O-rings in the assembly. In this and other modifications where no adjustable gland is provided, it is not necessary to make the dimensions of the parts to close tolerances, but instead they are designed to preload to the flat portion of the "Belleville" spring's load curve.

If desired an annular groove may be provided in the valve stem at 143 to seat a deformable sealing O-ring 144 of synthetic rubber, nylon, "Teflon" or the like.

The invention may be embodied in other specific forms without departing from the spirit or essential characteristics thereof. The present embodiments are therefore to be considered in all respect as illustrative and not restrictive, the scope of the invention being indicated by the appended claims rather than by the foregoing description, and all changes which come within the meaning and range

What is claimed and desired to be secured by United States Letters Patent is:

1. In a plug valve, a body having a plug seating bore, a plug rotatably mounted in said bore and having a stem projecting through a body opening, a stem packing comprising two axially spaced rigid annular members positively separated by an intermediate annular leg rigid with one of them and extending into abutment with the other, annular deformable substantially non-elastic O-rings radially compressed between opposite sides of said leg and the stem and body opening respectively, and an axially adjustable gland on said body surrounding said stem outwardly of the packing and adapted when adjusted in one direction to displace said members as a unit toward the top of said plug to positively transmit plug seating pressure from said gland to said plug without affecting the radial seal of said packing in the assembly.

2. In the plug valve defined in claim 1, the axially outermost of said members being integral with said gland and said leg being integral therewith.

3. In a plug valve, a body having a plug seating bore, a cover over the large end of said bore having an opening therethrough, a valve stem projecting from the plug through said opening, an annular diaphragm surrounding the plug-connected end of said stem and having its outer periphery clamped between the cover and body, a first rigid ring surrounding the stem and overlying the inner periphery of said diaphragm, a second rigid ring surrounding said stem with one of said rings having a rigid leg engaging the other ring so as to define concentric seal ring spaces with the stem and cover opening respectively, deformable radially compressed substantially non-elastic seal rings in said spaces, and means for positively axially displacing said rigid and deformable rings as a unit to exert plug seating pressure against and through the inner periphery of said diaphragm.

4. In a plug valve assembly, a body having a through passage for fluid flow and a tapered bore intersecting said passage at right angles, a ported plug rotatably mounted in said bore adapted to be turned between positions where it blocks said passage or permits fluid flow through the valve assembly, means for introducing a plastic sealant film between the seating surfaces of the plug and body bore, a stem for the plug projecting through an opening in the body, an axially rigid seal assembly surrounding said stem within the body opening axially outward of said plug, said seal assembly comprising inner and outer resilient O-rings in radially compressed engagement with adjacent surfaces of the stem and opening respectively, an axially adjustable gland surrounding said stem and mounted on said body axially outwardly of said seal assembly, said gland being adjustable toward the plug so that said seal assembly positively transmits plug seating pressure without affecting the radial seal of said seal assembly, in the opening, separate resilient means surrounding said stem interposed between said gland and said seal assembly adapted to be compressed and transmit plug seating force when said gland is adjusted to attain plug seating pressure position and when so compressed serving to urge the plug into seating engagement with said tapered bore and means for increasing the sealant pressure at said surfaces to separate said plug and body against the force of said compressed resilient means.

5. In a plug valve assembly, a body having a through passage for fluid flow and a tapered bore intersecting said passage at right angles, a ported plug rotatably mounted in said bore adapted to be turned between positions where it blocks said passage or permits fluid flow through the valve assembly, means for introducing a plastic sealant film between the seating surfaces of the plug and body bore, a stem for the plug projecting through an opening in the body, an axially rigid seal assembly surrounding said stem within the body opening axially outward of said plug, said seal assembly comprising inner and outer resilient O-rings in radially compressed engagement with adjacent surfaces of the stem and opening respectively, an axially adjustable gland surrounding said stem and mounted on said body axially outward of said seal assembly, and separate compressible and expansible resilient means surrounding said stem interposed between said gland and said seal assembly to urge the plug into seating engagement with said tapered bore, said resilient means being compressed by adjustment of said gland to a condition where it tends to expand and react against said gland to exert a desired plug seating force, and said resilient means having such characteristics that when adjusted to such condition further load over a predetermined range due to gland adjustment does not materially alter its compression or said plug seating force, thereby permitting adjustment of said gland to limit separation of said surfaces when jacking pressure is applied to said sealant without appreciably changing said plug seating force, said resilient means comprising spring means having substantially constant load vs. deflection characteristics within a predetermined range of compression and being prestressed within said range in the assembly.

6. In a plug valve assembly, a body having a through passage for fluid flow and a bore intersecting said passage at right angles, a ported plug rotatably mounted in said bore adapted to be turned between positions where it blocks said passage or permits fluid flow through the valve assembly, a rotatable stem for the plug projecting through an opening in the valve body, and means at said opening for exerting a desired plug seating pressure in the bore and for sealing said opening around the valve stem comprising a gland surrounding said stem and axially adjustable with respect to said stem and sealing means within the opening surrounding the stem comprising an annular rib rigid and movable with the gland and projecting axially toward said plug in radially spaced relation to the adjacent surfaces of the stem and the surrounding opening and an axially rigid ring section that is axially rigid with said rib, said gland, rib and ring section defining opposed annular recesses with said opening, said recesses opening only radially of the stem to said adjacent surfaces on said stem and opening respectively, and radially compressed O-rings of deformable sealing material within said recesses.

7. In a plug valve assembly having a body provided with a through passage and a tapered bore perpendicular to said passage, a tapered ported plug rotatably mounted in the bore to block or allow flow of fluid through the passage, an operating stem for the plug extending through an opening in the body, seal means surrounding the stem within the opening comprising axially rigid means defining opposed annular recesses opening radially of the stem to related surfaces of the stem and body opening respectively, radially compressed deformable seal rings in said recesses, and means for adjusting said seal means as a unit toward and effectively against the upper end of said plug for maintaining said plug seated in said bore with a predetermined pressure, the plug seating force being transmitted positively through said axially rigid means, and resilient means compressed by adjustment of said seal adjusting means cooperating with said seal means in urging the plug into seating engagement with said tapered bore.

8. In a plug valve assembly having a body provided with a through passage and a tapered plug seating bore perpendicular to said passage, a tapered ported plug rotatably mounted in the bore to block or allow flow of fluid through said passage, an operating stem for the plug having a cylindrical portion extending through a surrounding cylindrical portion of an opening in the body, seal means surrounding said stem at said cylindrical portion within the opening disposed in effective force transmitting abutment with the upper end of the plug and comprising two separate members in axially rigid contact defining opposed annular recess opening radially to the stem to related cylindrical surfaces of the stem and opening respectively, one of said members being substantially T-shaped and consisting of an annulus with an integral leg projecting from one side axially of said stem in spaced relation to both the stem and said opening, and the other member being an annulus in tight abutment with the free end of said leg, radially compressed deformable O-rings in said recesses, and means for adjusting said seal means as an axially rigid unit axially of said stem for determining and maintaining the seating pressure of said plug in said bore comprising a gland adjustably mounted in said body and metallic annular spring washer means compressed between said gland and the adjacent seal member, the plug seating force being transmitted positively through the compressed spring washer means and through said seal unit without altering the character of the radial seal at the surfaces of said opening and stem.

9. In the plug valve assembly defined in claim 8, said adjusting means comprising a gland axially adjustably mounted within said opening.

10. In the plug valve assembly defined in claim 9, said gland and said adjacent seal member having axially opposed parallel annular surfaces within said opening lying in planes inclined with respect to the axis of said stem, and said spring washer means being disposed between said surfaces.

11. In a plug valve assembly having a body provided with a through passage and a tapered bore perpendicular to said passage, a tapered ported plug rotatably mounted in the bore to block or allow flow of fluid through the passage, a rotatable operating stem for the plug extending through an opening in the body, seal means surrounding the stem within the opening consisting essentially of axially rigid means defining opposed annular recesses opening radially of the stem to related surfaces of the stem and body opening respectively and radially compressed resilient seal rings in said recesses, means for adjusting said seal means axially of said stem for maintaining the plug seated in said bore with a predetermined pressure, the plug seating force being transmitted positively through said axially rigid means, and resilient means comprising a metallic spring washer compressed in the assembly into actively resilient condition by adjustment of said seal adjusting means cooperating with said seal means in urging the plug into seating engagement with said tapered bore.

12. In a plug valve assembly having a body provided with a through passage and a tapered bore perpendicular to said passage, a tapered ported plug rotatably mounted for seating in the bore to block or allow flow of fluid through the passage, an operating stem for the plug extending through an opening in the body, seal means surrounding the stem within the opening comprising an annular structure which is rigid under axial compression and defines opposed annular recesses opening radially of the stem to related surfaces of the stem and body opening respectively, radially compressed deformable seal rings located in said recesses, annular metallic spring washer means within said opening surrounding said stem adjacent said seal means, and a gland member associated with said opening and adjustable axially to axially compress said annular metallic spring washer means and urge said seal means as a unit operatively against the upper end of said plug to provide and maintain a desired seating force on said plug that is transmitted through the annular structure of said seal means and said compressed resilient means.

13. In a plug valve assembly, a body having a through passage for fluid flow and a bore intersecting said passage at right angles, a ported plug rotatably mounted in said bore adapted to be turned between positions where it blocks said passage or permits fluid flow through the valve assembly, a rotatable stem for the plug projecting through an opening in the valve body, and means at said opening for exerting a desired plug seating pressure in the bore and for sealing around the valve stem comprising an annular gland surrounding said stem and axially adjustable with respect to said stem and sealing means within the opening surrounding the stem comprising an annular rib rigid with the gland and projecting axially toward said plug in radially spaced relation to the adjacent surface of the stem, said gland, rib and stem defining an annular recess opening radially to the stem, a radially compressed O-ring of deformable sealing material within said recess, and means extending rigidly between said rib and the upper end of said plug for rigidly transmitting gland adjustment to said plug.

14. In a plug valve assembly having a body provided with a through passage and a tapered bore perpendicular to said passage, a tapered ported plug rotatably mounted for seating in the bore to block or allow flow of fluid through the passage, an operating stem for the plug extending through an opening in the body, seal means surrounding the stem within the opening comprising an annular structure which is rigid under axial compression and defines opposed annular recesses opening radially of the stem to related surfaces of the stem and body opening respectively, radially compressed deformable seal rings located in said recesses, an annular metallic spring washer within said opening surrounding said stem adjacent said seal means, and a member associated with said opening in operative motion transmitting engagement with said seal means and adjustable axially to compress said spring washer and urge said seal means as a unit operatively against the upper end of said plug to provide and maintain a desired seating force on said plug that is transmitted through the annular structure of said seal means and said compressed spring washer means, said member being a gland adjustable axially of said body opening, and said spring washer means being interposed between the gland and the rigid annular structure of said seal means.

15. In the plug valve assembly defined in claim 14, said adjustable member and said annular seal structure having axially spaced surfaces facing each other longitudinally of said stem, and said resilient means being an annular plate spring of generally dished shape clear of contact with said valve stem and having its outer periphery engaged with one of said surfaces and its inner periphery engaged with the other of said surfaces.

16. In a plug valve assembly having a body provided with a through passage and a tapered bore perpendicular to said passage, a tapered ported plug rotatably mounted in the bore to block or allow flow of fluid through the passage, a rotatable operating stem for the plug extending through an opening in the body, seal means surrounding the stem within the opening consisting essentially of axially rigid means defining opposed annular recesses opening radially of the stem to related surfaces of the stem and body opening respectively and radially compressed resilient O-rings in said recesses, means for adjusting said seal means axially of said stem and operatively against the upper end of said plug for maintaining the plug seated in said bore, the plug seating force being transmitted positively through said axially rigid means, and spring means disposed between said seal adjusting means and said axially rigid means compressed in the assembly by adjustment of said seal adjusting means into actively resilient condition for urging the plug into seating engagement with said tapered bore with a substantially constant pressure, said spring means in the assembly permitting separational displacement of the plug and bore seating surfaces within a predetermined range without appreciable change in said seating pressure.

17. In the plug valve assembly defined in claim 16, means limiting compression of said spring means to provide a positive stop defining the maximum separation of said plug and bore seating surfaces.

References Cited by the Examiner
UNITED STATES PATENTS

| | | | |
|---|---|---|---|
| 2,229,120 | 1/41 | Nordstron | 137—246.19 |
| 2,307,443 | 1/43 | Atkinson et al. | 137—246.15 X |
| 2,451,269 | 10/48 | Allen et al. | 285—111 |
| 2,675,225 | 4/54 | Migny | 267—1 |
| 2,678,837 | 5/54 | Griefen | 277—95 |
| 2,706,491 | 4/55 | Kohler | 267—1 X |
| 2,876,987 | 3/59 | Renfro | 251—214 |
| 3,030,067 | 4/62 | Manor | 251—214 |

FOREIGN PATENTS

| | | |
|---|---|---|
| 958,598 | 9/49 | France. |
| 1,130,592 | 10/56 | France. |
| 839,300 | 5/52 | Germany. |
| 842,290 | 6/52 | Germany. |

ISADOR WEIL, *Primary Examiner.*

M. CARY NELSON, *Examiner.*